(12) United States Patent
Wilkinson et al.

(10) Patent No.: US 12,228,524 B2
(45) Date of Patent: Feb. 18, 2025

(54) METHODS AND SYSTEMS TO LOCATE ANOMALIES ALONG AN INSIDE SURFACE OF A CONVEYANCE PIPE

(71) Applicant: SonDance Solutions LLC, Pinehurst, TX (US)

(72) Inventors: Jeffery M Wilkinson, Spring, TX (US); Jay C Bowen, Pinehurst, TX (US); Stephen P Rowland, Magnolia, TX (US); Cris K Weber, Austin, TX (US)

(73) Assignee: SonDance Solutions LLC, Pinehurst, TX (US)

( * ) Notice: Subject to any disclaimer, the term of this patent is extended or adjusted under 35 U.S.C. 154(b) by 326 days.

(21) Appl. No.: 17/936,895

(22) Filed: Sep. 30, 2022

(65) Prior Publication Data

US 2023/0106516 A1 Apr. 6, 2023

Related U.S. Application Data

(60) Provisional application No. 63/262,118, filed on Oct. 5, 2021.

(51) Int. Cl.
*F16L 55/32* (2006.01)
*F16L 55/40* (2006.01)
(Continued)

(52) U.S. Cl.
CPC ............ *G01N 21/954* (2013.01); *F16L 55/40* (2013.01); *G06T 7/0004* (2013.01); *G06T 7/70* (2017.01);
(Continued)

(58) Field of Classification Search
CPC ......... G01N 21/954; G01N 2021/8887; G01N 2021/9544; F16L 55/40; F16L 2101/30;
(Continued)

(56) References Cited

U.S. PATENT DOCUMENTS

2005/0115337 A1* 6/2005 Tarumi ................. F16L 55/32
73/865.8
2011/0196534 A1* 8/2011 Ekes ...................... F17D 5/00
901/44
(Continued)

FOREIGN PATENT DOCUMENTS

| JP | 2002357563 A | 12/2002 |
| JP | 2004219130 A | 8/2004 |
| JP | 2012013595 A | 1/2012 |

OTHER PUBLICATIONS

International Search Report and Written Opinion dated Jan. 26, 2023 for corresponding PCT Patent Application No. PCT/US2022/077324 filed on Sep. 30, 2022.

*Primary Examiner* — Howard D Brown, Jr.
(74) *Attorney, Agent, or Firm* — K&L Gates LLP (57) ABSTRACT

Embodiments disclosed herein are directed to systems and methods for locating an anomaly along an inside surface of a conveyance pipe containing two mediums separated by a two medium interface. The systems and methods include an assembly transportable within the conveyance pipe. The assembly includes an enclosure that is at least partially transparent and is positionable to be located both above and below the two medium interface. An upper camera and a lower camera enclosed within the enclosure are operable to capture images of the inside surface of the conveyance pipe above and below the two medium interface. A data acquisition unit is in electronic communication with the upper camera and the lower camera, and includes a processor programmed to determine a presence and a location of the anomaly by analyzing the captured images.

20 Claims, 3 Drawing Sheets

(51) Int. Cl.
*G01N 21/954* (2006.01)
*G06T 7/00* (2017.01)
*G06T 7/70* (2017.01)
*H04N 7/18* (2006.01)
*H04N 23/51* (2023.01)
*H04N 23/56* (2023.01)
*H04N 23/90* (2023.01)
*F16L 101/30* (2006.01)
*G01N 21/88* (2006.01)

(52) U.S. Cl.
CPC ............. *H04N 7/181* (2013.01); *H04N 23/51* (2023.01); *H04N 23/56* (2023.01); *H04N 23/90* (2023.01); *F16L 2101/30* (2013.01); *G01N 2021/8887* (2013.01); *G01N 2021/9544* (2013.01); *G06T 2207/30108* (2013.01)

(58) Field of Classification Search
CPC ................... G06T 7/0004; G06T 7/70; G06T 2207/30108; G06T 2207/10028; G06T 2207/20081; H04N 7/181; H04N 23/51; H04N 23/56; H04N 23/90; H04N 7/185; G03B 37/005
See application file for complete search history.

(56) References Cited

U.S. PATENT DOCUMENTS

| | | | |
|---|---|---|---|
| 2015/0378363 A1* | 12/2015 | Lerner | G05B 15/02 700/282 |
| 2016/0320282 A1* | 11/2016 | Dingman | G01N 9/24 |
| 2018/0187395 A1* | 7/2018 | Nagata | E02F 3/905 |
| 2019/0331284 A1* | 10/2019 | Phillips | G05D 1/0011 |

* cited by examiner

METHODS AND SYSTEMS TO LOCATE ANOMALIES ALONG AN INSIDE SURFACE OF A CONVEYANCE PIPE

BACKGROUND

This section is intended to provide relevant background information to facilitate a better understanding of the various aspects of the described embodiments. Accordingly, these statements are to be read in this light and not as admissions of prior art.

Conveyance pipes are used for the transport of materials in a variety of situations in multiple industries, both onshore and offshore, including sewage, construction (environmental and civil), irrigation (farms/ranches), dredging, oil and gas, and mining. The composition of the pipes includes steel, cast iron, aluminum, plastic, and concrete.

The material transported in the conveyance pipe tends to deteriorate the inner diameter by way of frictional wear or mechanical wear at locations along the length of the conveyance pipe. Depending on the composition of the conveyance pipe, the material conveyed may deteriorate the pipe wall thickness by erosion, pitting, corrosion, delamination, and other internal means. Un-monitored wear-and-tear of conveyance pipes results in operational shutdowns caused by costly pipe leaks and pipe bursts. Sections of the conveyance pipe that leak or burst must be replaced for operations to resume. Thus, proactive maintenance and quality control processes for locating and determining changes in the conveyance pipe inner diameter and in the conveyance pipe wall thickness are desirable for optimal and profitable pipe operations.

In offshore dredging applications, for example, a high-density polyethylene pipe is used to internally convey materials extracted from the ocean floor. During dredging operations, abrasive materials such as sand, shell, and rocks are conveyed within the conveyance pipe and lead to reductions to the pipe's wall thickness. Reductions in wall thickness may be gradual and distributed in location or may be focused along particular regions. Local reductions in wall thickness may also be due to gouges as sharp or hard materials locally impinging on the inner diameter and sections of the inner diameter are removed. Multi-layer composite pipes (e.g., high density polyethylene with layers of rubber or other polymers deposited along the inner diameter) may also experience sections of delamination between the constituent layers. In some instances the delamination or local gouges do not fully remove the section of the inner diameter and instead a flap is formed that protrudes from the inner diameter. Such flaps hinder flows within the conveyance pipe, particularly when the flaps are hinged against the direction of the fluid flow. As the fluid flow continues past the flaps, the flaps increasingly "open up" and deflect toward the inner diameter. The continued use of the conveyance pipe having flaps can also lead to rapid increases in the flap size and additional damage to the inner diameter as the flap lifts, continues to tear, and causes additional delamination.

Current quality control processes vary in methods, time, and costs, requiring a pipe to be filled with one medium of liquid, air, or gas. A conventional visual manual inspection of the pipe during shutdowns can consume days or weeks of non-operational time due to the pipe being completely drained of material and filled with one medium, such as air, for an accurate analysis. Offshore located conveyance pipes can consume even additional inspection time, because conventional methods also include moving the offshore conveyance pipe onshore so that personnel can physically enter and inspect sections of the conveyance pipe. Conventional non-destructive pipe inspections with one medium within the inner diameter, such as air, utilize methods such as radiographic, ultrasonic, mechanical, electromagnetic eddy current, and magnetic particle technologies. These inspections are commonly used on steel, aluminum, and pipes that are made of conductive materials and are not used for nonmetallic conveyance pipes. Alternatively, other quality control processes such as pipeline inspection gauges, referred to as pigs, can be pumped within the conveyance pipe during operations. Pipeline pigs can minimize operational downtime and can perform various functions such as cleaning the pipe and obtaining images of the inner diameter with cameras. Pigs, referred to as "smart pigs" may also be instrumented with additional measurement or inspection technologies and may relay or record inspection or measurement data. Smart pigs used in conductive pipe may use the conductivity of the pipe to transmit and communicate the measurements or inspection data. Such smart pigs are conventionally only used in conveyance pipes filled with one medium (e.g., liquid or gas) due to difficulties of making accurate measurements or inspections. For example, cameras have difficulty obtaining accurate images in an environment containing two mediums (e.g., liquid and gas) due in part to the interface between the two mediums causing image distortion.

SUMMARY

Embodiments disclosed herein are directed to systems for locating an anomaly along an inside surface of a conveyance pipe containing two mediums separated by a two medium interface. The systems include an assembly transportable within the conveyance pipe. The assembly includes an enclosure that is at least partially transparent and is positionable to be located both above and below the two medium interface. Additionally, some embodiments may include an upper camera and a lower camera enclosed within the enclosure and operable to capture images of the inside surface of the conveyance pipe above and below the two medium interface. Additionally the assembly includes a data acquisition unit in electronic communication with the upper camera and the lower camera, the data acquisition unit including a processor programmed to determine a presence and a location of the anomaly by analyzing the captured images.

Other embodiments disclosed herein are directed to methods for locating an anomaly along an inside surface of a conveyance pipe containing two mediums separated by a two medium interface. The methods include transporting an assembly within the conveyance pipe. The assembly includes an enclosure that is at least partially transparent, and the enclosure is positioned both above and below the two medium interface. The methods further including capturing images of the inside surface of the conveyance pipe above and below the two medium interface using an upper camera and a lower camera enclosed within the enclosure. Additionally, the methods include determining a presence and a location of the anomaly by analyzing the captured images using a processor of a data acquisition unit.

Aspects of one or more embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Various refinements of the features noted above may exist in relation to various aspects of the present embodiments. Additional features may also be incorporated in these various aspects. These refinements and additional features may exist individually or in any combination. For instance, various features discussed in relation to one or more of the illustrated embodiments may be incorporated into any of the other described aspects of the present disclosure alone or in any combination. Again, the brief summary presented is intended only to familiarize the reader with certain aspects and contexts without limitation to the claimed subject matter. The features depicted in the figures are not necessarily shown to scale. Certain features of the embodiments may be shown exaggerated in scale or in somewhat schematic form, and some details of elements may not be shown in the interest of clarity and conciseness.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, not all features of an actual implementation may be described. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "compris- ing," "including," and "having" are intended to be inclusive and mean that there may be additional elements other than the listed elements. Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

Figure 1:
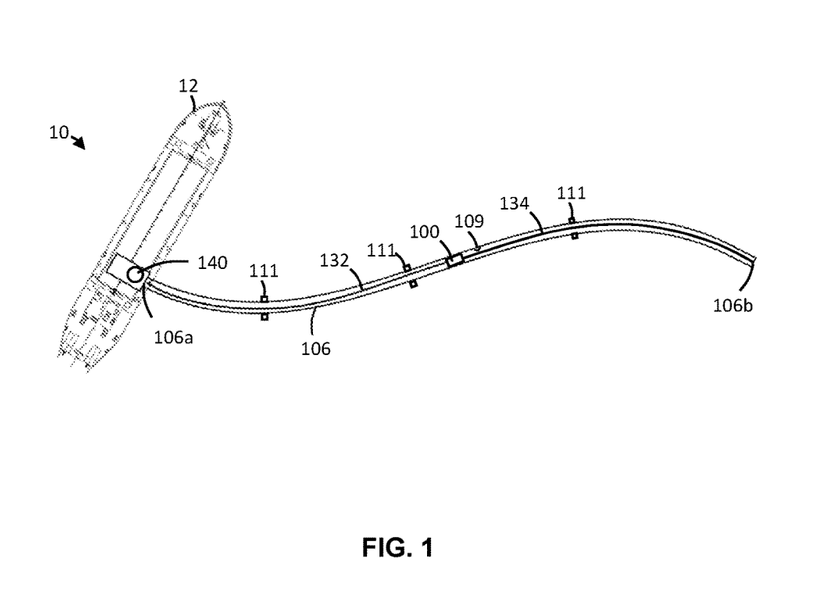
FIG. 1 is a top schematic view of a dredging system that includes an embodiment of a system for locating and determining anomalies in a conveyance pipe, in accordance with the present disclosure.

Referring to FIG. 1, a dredging system 10 is shown that is used to transfer a slurry within a conveyance pipe 106 between a first end 106a of the conveyance pipe 106 and a second end 106b of the conveyance pipe 106. A barge 12 is shown that transports pumps and related equipment (not shown) of the dredging system 10. The dredging system 10 is configured to collect solids from the seafloor, mix the solids with a volume of fresh water or seawater to form a slurry, and then pump the slurry along the conveyance pipe 106. The conveyance pipe 106 is shown along a curved path in the example of FIG. 1, however the conveyance pipe 106 may also be positioned along a straight path. Optionally, portions of the conveyance pipe 106 between the ends 106a, 106b may be at the same or at different elevations than the ends 106a, 106b (e.g., central portions may have a rise, a dip, or combinations thereof). Optionally, the elevation between the first end 106a and the second end 106b may also be different. In the example of FIG. 1, the conveyance pipe 106 comprises a plurality of tubular sections connected end to end at joints 111. The joints 111 may be formed by any connection method known in the art such as screw connections, welding, flange connections, etc., or the conveyance pipe 106 may be a formed as continuous section with no joints 111.

During operations of the dredging system 10, wear-and-tear may occur to the inner diameter of the conveyance pipe 106, forming an anomaly 109 (e.g., a gouge, a reduction in wall thickness, an increase in inner dimeter, a flap, a delamination, etc.) at one or more positions within the conveyance pipe 106 between the first end 106a and the second end 106b. As part of a preventive maintenance and inspection schedule, the dredging system 10 has been shut down to cease slurry transport and a system 100 has been positioned within the inner diameter of the conveyance pipe 106. The system 100 is transportable along the full length of the conveyance pipe 106 so that inspections of the inside surface of the conveyance pipe 106 can be performed along the length of the conveyance pipe 106. In some uses, the system 100 can be used to inspect the full 360-degrees of the inside surface along the full length of the conveyance pipe 106 between the ends 106a, 106b. The system 100 may be deployed into either the first end 106a or the second end 106b and thus may be transported from the first end 106a to the second end 106b, or may be transported from the second end 106b to the first end 106a.

In conveyance pipes 106 made from high density polyethylene with layers of rubber or other polymers deposited along the inner diameter (such as those used in the dredging industry), flap type anomalies 109 tend to hinge against the direction of the fluid flow (e.g., against the fluid flow away from the barge 12). Therefore the system 100 may be advantageously transported from the second end 106b to the first end 106a so that any flap contacted by the system 100 tends to press the flaps closed towards the inside surface 107 (shown in FIG. 2) of the conveyance pipe 106 rather than catching and restricting the passage of the system 100. Alternatively, the system 100 may be deployed from a separate vessel or platform (not shown) as needed for the particular implementation. Although FIG. 1 depicts the dredging system 10 located offshore, it should be appreciated that the methods and systems disclosed may also be used onshore and may be used for other types of conveyance pipes 106. Additionally, the system 100 may be used onshore or offshore when substantially only one phase (e.g., only the gas medium 108 or the liquid medium 110) fills all of the conveyance pipe 106 between ends 106a, 106b or when only one phase substantially fills portions of the conveyance pipe 106 at locations between ends 106a, 106b.

Figure 2:
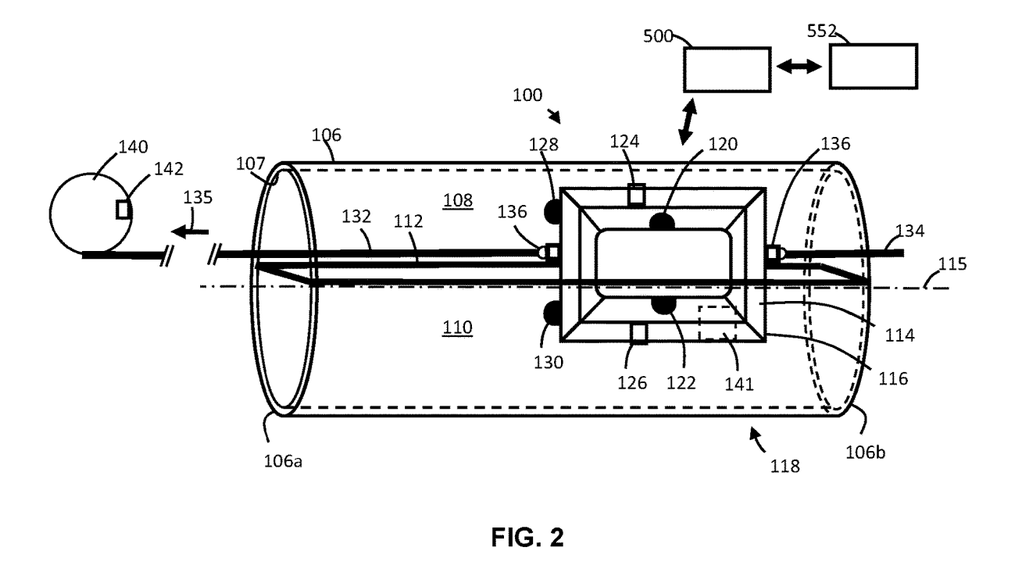
FIG. 2 is a schematic diagram of an embodiment of a system for locating and determining anomalies in the conveyance pipe, where the system is transportable with a tow cable.

Referring to FIG. 2, the system 100 is shown in a schematic view deployed within an inside surface 107 of the conveyance pipe 106. The conveyance pipe 106 contains two-mediums, a gas medium 108 and a liquid medium 110, separated by a two-medium interface 112. The system 100 includes an assembly 118 comprising an at least partially transparent enclosure 114 coupled to a frame 116. The enclosure 114 is sealed and is at least partially filled with a gas such as nitrogen or air and provides buoyancy to the assembly 118. In the example of FIG. 2, the assembly 118 floats within the liquid medium 110 such that a portion of the assembly 118 is above the two medium interface 112 and a portion of the assembly 118 is below the two medium interface 112. The distribution of weight within the assembly 118 and the shape of the assembly 118 promote a stable orientation relative to the direction of gravity so that components (e.g., cameras, sensors, etc.) along the assembly 118 maintain a relatively constant orientation as the assembly 118 passes along the length of the conveyance pipe 106. For example, a weight 141 may be coupled to the assembly 118 to move the center of gravity of the assembly 118. By spacing the center of gravity of the assembly 118 away from the center of buoyancy of the assembly 118, a stable orientation relative to the direction of gravity is established. As the assembly 118 floats within the liquid medium 110, the center of buoyancy will align vertically above the center of gravity of the assembly 118. An increased mass of the weight 141 and an increased distance between the assembly 118 center of gravity and the center of buoyancy tend to provide increasingly greater degrees of stability.

The frame 116 also has swivels 136 attached to the front and rear for the attachment of a front tow cable 132 and a rear tow cable 134 that each extend longitudinally through the conveyance pipe 106. The swivels 136 allow pulling forces to be applied to the assembly 118 via the front tow cable 132 and rear tow cable 134 as needed without imparting a rotational moment to the assembly 118 via the cables 132, 134 (e.g., a rotational moment imparted from twisting of the cables 132, 134). The swivels 136 thus also allow the assembly 118 to maintain a relatively constant orientation as the assembly 118 passes along the length of the conveyance pipe 106. During use of the system 100, the assembly 118 is transported through the conveyance pipe 106 in the direction 135 by applying mechanical force via the front tow cable 132. In an example, a separate remotely operated vehicle (ROV) (not shown) is used to place the front tow cable 132 though the length of the conveyance pipe 106 before the assembly 118 is placed within the conveyance pipe 106. However, any method may be used to initially pass the front tow cable 132 though the length of the conveyance pipe 106. Similarly, any method of pulling the front tow cable 132 may be used and the rate of retrieval may be varied as needed for the specific implementation. In an example, the separate ROV (not shown) is deployed within the conveyance pipe 106 and used to pull the front tow cable 132 and transport the assembly 118. In an example, a constant rate of retrieval is used such that a relatively constant bow wave is formed between the assembly 118 and the two medium interface 112 as the assembly 118 is transported. In the example of FIG. 2, a reel 140 is used to retrieve the front tow cable 132 at a substantially constant rate and a transducer 142 is used to capture the angular position of the reel 140 as a function of time. The signal from the transducer 142 is relatable to a length of the front tow cable 132 within the conveyance pipe 106 and is thus relatable to a longitudinal position relative to ends 106a, 106b of the assembly 118 as a function of time. The signal from the transducer 142 may be collected by a data acquisition unit 500 concurrently with measurement signals or image signals from the assembly 118, so that the data collected by the assembly 118 can be related to a longitudinal position within the conveyance pipe 106. Alternatively, the transducer 142 can also be mounted separately from the reel 140 and can track the motion and displacement of the front tow cable 132 by other methods. Alternatively, the transducer 142 can also be mounted in a separate reel (not shown) that is used to deploy the rear tow cable 134 as the assembly 118 is transported through the conveyance pipe 106.

The rear tow cable 134 may apply a constant tension to the rear swivel 136 to aid in stabilizing the motion of the assembly 118 during transport through the conveyance pipe 106. For example the rear tow cable 134 may stabilize the assembly 118 by dampening or otherwise restrict assembly 118 motions (e.g., stabilize roll, pitch, yaw, surge, sway, and/or heave of the assembly 118). The constant tension of the rear tow cable 134 may be provided by a friction tensioned spool (not shown) that stores and deploys a length of the rear tow cable 134 as the assembly 118 is transported. Alternatively, the rear tow cable may apply substantially no tension as the assembly 118 is transported within the conveyance pipe 106. In some instances, the rear tow cable 134 may simply be used to retrieve the assembly 118 in the event of the assembly 118 becoming stuck within the conveyance pipe 106.

The enclosure 114 houses an upper camera 120 and a lower camera 122 for imaging the inside surface 107 of the conveyance pipe 106 a full 360-degrees around the central axis 115. As described herein, "images" shall be interpreted to include both still photographic images as well as video recordings. The upper camera 120 and a lower camera 122 may be equipped with a fish eye lens or similar lens to provide at least a 180-degree range of view. Ranges of view larger than 180-degrees may also be used and overlapping images from upper camera 120 and the lower camera 122 may be "stitch together" by the data acquisition unit 500 to construct a full 360-degree image. To select the appropriate lens for each of the upper camera 120 and the lower camera 122, the optical characteristics of the gas medium 108 and the liquid medium 110 may be measured prior to operations of the system 100. For example a Secchi disc, known in the industry, may be used to measure the turbidity of the liquid medium 110 to select the proper lenses.

The upper camera 120 is defined as "upper" because it is positioned above the two medium interface 112 when the assembly 118 is placed within the conveyance pipe 106. Similarly, the lower camera 122 is defined as "lower" because it is positioned below the two medium interface 112 when the assembly 118 is placed within the conveyance pipe 106. However, the assembly 118 may comprise a plurality of upper cameras 120 and/or a plurality of lower cameras 122. In an example, the plurality of upper cameras 120 and the plurality of lower cameras 122 may be arranged circumferentially relative to the central axis 115. The quantity of upper cameras 120 and lower cameras 122 may be the same or may be different so that either an odd or even number of total cameras 120, 122 are used. Similarly, the circumferential spacing between adjacent upper cameras 120 may be the same or different from the circumferential spacing between adjacent lower cameras 122. Further, the lenses of the upper cameras 120 may be the same or different from the lenses of the lower cameras 122. Still further, the radial distance between the upper cameras 120 and the perimeter of the enclosure 114 may be the same or a different distance between the lower cameras 122 and the perimeter of the enclosure 114.

When the assembly 118 is placed within the liquid medium 110, the assembly 118 floats in the liquid medium 110 in an orientation such that the upper camera 120 is positioned above the two medium interface 112 and the lower camera 122 is positioned below the two medium interface 112. The enclosure 114 is at least partially transparent so that the upper camera 120 and the lower camera 122 can capture images of the inside surface 107 of the conveyance pipe 106 through the material of the enclosure 114. For example, the enclosure may be made of glass or a clear polymer such as polycarbonate, acrylic, polyethylene, polypropylene, polystyrene, ABS, etc. Alternatively, the lenses of the cameras 120, 122 can extend through the enclosure 114 and the remainder of the enclosure 114 can be made non-transparent.

An upper light 124 and a lower light 126 are coupled to the assembly 118 and emit light onto the inside surface 107 of the conveyance pipe 106. The mounting of the lights 124, 126 may be internal to the enclosure 114, may be external to the enclosure 114, or a portion of the lights 124, 126 may extend through a wall of the enclosure 114. To minimize glare between the lights 124, 126 and the enclosure 114, as recorded in the images of the cameras 120, 122, the light may be emitted from a position outside of the enclosure 114 when the lenses of the cameras 120, 122 are positioned inside the enclosure 114. Alternatively, glare can also be minimized by emitting light from outside the enclosure 114 when the lenses of the cameras 120, 122 are also positioned outside of the enclosure 114. Alternatively, glare can also be minimized by emitting light from inside the enclosure 114 when the lenses of the cameras 120, 122 are positioned outside of the enclosure 114. The upper light 124 is defined as "upper" because it is positioned above the two medium interface 112 when the assembly 118 is placed within the conveyance pipe 106. Similarly, the lower light 126 is defined as "lower" because it is positioned below the two medium interface 112 when the assembly 118 is placed within the conveyance pipe 106. However, the assembly 118 may comprise a plurality of upper lights 124 and/or a plurality of lower lights 126. In an example, the plurality of upper lights 124 and the plurality of lower lights 126 may be arranged circumferentially relative to the central axis 115 and around a perimeter of the enclosure. The quantity of upper lights 124 and lower lights 126 may be the same or may be different so that either an odd or even number of total lights 124, 126 are used. Similarly, the circumferential spacing between adjacent upper lights 124 may be the same or different from the circumferential spacing between adjacent lower lights 126.

The assembly 118 optionally further comprises an upper light detection and ranging device 128 (herein, "upper LiDAR device 128") and a lower light detection and ranging device 130 (herein, "lower LiDAR device 130") coupled to the assembly 118. The upper LiDAR device 128 and lower LiDAR device 130 use light and/or light in the form of a laser to measure distances by emitting light to a target object or surface and then measuring the time for the reflected light to return to an integrated receiver. In this manner the upper and lower LiDAR devices 128, 130 measure the diameter of the inside surface 107 along a common plane. For example, when the assembly 118 is placed within the liquid medium 110, the upper LiDAR device 128 is positioned above the two medium interface 112 and the lower LiDAR device 130 is positioned below the two medium interface 112. The mounting positions and distances between the upper LiDAR device 128 and the lower LiDAR device 130 are known so the measured distances by the upper LiDAR device 128 and the lower LiDAR device 130 are relatable to the diameter of the inside surface 107 of the conveyance pipe 106. The speed of light is different in the gas medium 108 relative to the liquid medium 110, thus light or lasers from the upper LiDAR device 128, lower LiDAR device 130 may bend (e.g., light refraction) depending on the angle of incidence when passing between the mediums 108, 110 via the two medium interface 112. In addition, the two medium interface 112 may also cause reflections as the light or lasers from the upper LiDAR device 128 and the lower LiDAR device 130. Therefore, the positioning of the upper LiDAR 128 above the two medium interface 112 and the lower LiDAR device 130 below the two medium interface 112 allows reliable distance measurements to be collected. Additionally, at least the sending and receiving portions of the upper LiDAR device 128 and the lower LiDAR device 130 may be advantageously positioned outside of the enclosure 114 to also eliminate potential refractions and reflections passing through the enclosure 114. In the example of FIG. 2, the upper LiDAR device 128 and the lower LiDAR device 130 are mounted fully outside the enclosure 114. The upper LiDAR device 128 and the lower LiDAR device 130 are also positioned in diametrically opposite positions relative to a geometric central axis of the assembly 118 and face radially outward in opposite directions along the common plane. In this manner, the pair of LiDAR devices 128, 130 are positioned and operable to measure the diameter of the inside surface 107 along the common plane.

Optionally, additional LiDAR devices (not shown) may be coupled to the enclosure 114 and arranged in a circumferential pattern relative to the central axis 115 so that the inner diameter of the inside surface 107 is measured along multiple angular positions. Thus the upper LiDAR device 128 may comprise a plurality of upper LiDAR devices 128 and the lower LiDAR device 130 may comprise a plurality of lower LiDAR devices 130. In an example, each of the plurality of the upper LiDAR devices 128 are positioned in diametrically opposite positions relative to each of the plurality of the lower LiDAR devices 130 such that each pair faces radially outward in opposite directions. By circumferentially arranging the pairs of LiDAR devices 128, 130, a first pair of LiDAR devices 128, 130 measures a first diameter of the inside surface 107 along a first common plane, while the second pair of LiDAR devices 128, 130 measures a second diameter of the inside surface 107 along a second common plane that is angularly positioned relative to the first common plane. The quantity of the pairs of LiDAR devices 128, 130 may be increased as needed to capture three, four, or more separate diameter measurements of the inside surface 107. In this manner, the location of anomalies (such as the anomaly 109 of FIG. 1) may be detected as increases in the diameter of the inside surface 107 along one, two, three, four, or more common planes that are angularly distributed relative to the central axis 115. The angular placement and spacing between the measurements from the upper LiDAR device 128 and the lower LiDAR device 130 thus influence the size of the anomaly 109 that may be detected via the measurements. Optionally, the total number of LiDAR device 128, 130 may also be an odd number such as three, five, seven, etc. and the positioning of the LiDAR devices 128, 130 may not be diametrically opposite along a common plane containing the geometric central axis of the assembly 118. For example, it is anticipated that three total LiDAR devices 128, 130 may be used, each facing radially outward from a geometric central axis of the assembly 118, and circumferentially spaced by approximately 120 degrees. Similarly, five total LiDAR devices 128, 130 may be circumferentially spaced by approximately 72 degrees. Further, seven total LiDAR devices 128, 130 may be circumferentially spaced by approximately 51.4 degrees. The LiDAR devices 128, 130 positioned above the two medium interface 112 will be defined as upper LiDAR devices 128, while those positioned below the two medium interface 112 will be defined as lower LiDAR devices 130.

During or after the transportation of the assembly 118 through the pipe 106, the captured images from the cameras 120, 122 and the measurements from the LiDAR devices 128, 130 may be transmitted via wired or wireless means to the data acquisition unit 500 for job-site analysis to determine the presence and location of the anomalies 109. In nonmetallic conveyance pipes 106, Wi-Fi, Bluetooth, and/or other wireless communication protocols may be used between the assembly 118 and the data acquisition unit 500 for real-time monitoring and data analysis as the assembly 118 is transported along the conveyance pipe 106. The data acquisition unit 500 may also be in electric communication with a remote terminal 552 (e.g., a tablet, computer, cell phone, display, etc.) via wired or wireless means. The remote terminal 552 may be positioned onsite proximate to the conveyance pipe 106 or may be offsite at a remote location with the data from the data acquisition unit 500 being transmitted over the internet, satellite, or via wired or wireless communication protocols.

An operator of the system 100 may identify anomalies 109 based on the images of the cameras 120, 122 and/or measurements from the LiDAR devices 128, 130. In an example, the conveyance pipe 106 comprises high density polyethylene with multiple layers of rubber deposited along the inside surface 107. Between each layer of rubber is an embedded wear indicating layer having a different color. Thus as rubber material is removed from the inside surface 107 due to wear-and-tear, successive wear indicating layers become visible. The embedded depths for each wear indicting layer is known and so the appearance of the wear indicating layer corresponds to a particular anomaly 109 depth. Therefore visual inspections with the cameras 120, 122 can allow the operator to locate the presence and location of the anomaly 109. However, when the anomaly 109 penetrates deeper than the wear indicating layer and enters the next layer of rubber, the appearance of the wear indicating layer is only visible along the perimeter of the anomaly 109 and detectability may be limited. Accordingly, the operator of the system 100 may also use the measurements from the LiDAR devices 128, 130 to detect the presence and location of the anomaly 109, or may use the measurements from the LiDAR devices 128, 130 separately from the captured camera 120, 122 images.

The data acquisition unit 500 may be also be configured to automate inspections of the camera 120, 122 images and/or measurements from the LiDAR devices 128, 130. For example, measurements from the LiDAR devices 128, 130 may be acquired along the length of the conveyance pipe 106 and a digital map of the inside surface 107 may be produced by the data acquisition unit 500. The captured images from the cameras 120, 122 and/or measurements from the LiDAR devices 128, 130 may be analyzed by the processor 502 of the data acquisition unit 500 during or after the transportation of the assembly 118 through the conveyance pipe 106. The captured images from the cameras 120, 122 and/or measurements from the LiDAR devices 128, 130 may also be transmitted to the network communication module 508 of the data acquisition unit 500 via wired or wireless means as previously described. Measurements from the LiDAR devices 128, 130 of the inside surface 107 that are larger than the known dimensional variations for the inside surface 107 can then be classified by the processor 502 of the data acquisition unit 500 as an anomaly 109. For example, if the unworn inside surface 107 is manufactured to have an inner diameter of 30-inches plus or minus 0.5-inches, the expected diameter range (without anomalies 109) would be 29.5-inches to 30.5-inches. The non-transitory computer-readable medium 504 stores the expected diameter range of 29.5-inches to 30.5-inches for comparisons against the measurements from the LiDAR devices 128, 130 of the inside surface 107. Measurements from the LiDAR devices 128, 130 that indicate a diameter larger than 30.5-inches are classified by the processor 502 of the data acquisition unit 500 as an anomaly 109. Identified anomalies 109 can be stored within the non-transitory computer-readable medium 504, can be displayed to the operator of the system 100 via the display 512, and/or may alert the operator of the system 100 via one or more input/output devices 510. The data acquisition unit 500 can also be operated to display the camera 120, 122 images to the operator on the display 512 for further visual confirmation and characterization of the anomaly 109.

As previously described, the longitudinal position of the anomalies 109 may be determined using the signal from the transducer 142 as collected by the data acquisition unit 500. More specifically, the transducer 142 may be in electrical communication with the data acquisition unit 500 via wired or wireless means. The signal from the transducer 142 may be stored in the non-transitory computer-readable medium 504 at the same time as the images from the cameras 120, 122 and/or the measurements from the LiDAR devices 128, 130 are stored. By correlating the images and/or measurements to position within the conveyance pipe 106, the longitudinal positions of the anomalies 109 may be determined and recorded within the non-transitory computer-readable medium 504 of the data acquisition unit 500. Alternatively or additionally, the data acquisition unit 500 may also be operable to determine the location of the anomalies 109 by counting the quantity of the joints 111 (shown in FIG. 1) as the assembly 118 is transported within the conveyance pipe 106. To identify and count the quantity of joints 111, the captured images from the cameras 120, 122 or the measurements from the LiDAR devices 128, 130, or both the images and the measurements may be used by the data acquisition unit 500. Further, repeated inspections of the anomalies 109 can be made. By knowing the size and the position of the anomaly 109, subsequent inspections of the anomaly 109 could be repeated after further use of the conveyance pipe 106 and a wear history could be developed and recorded within the non-transitory computer-readable medium 504 of the data acquisition unit 500.

The data acquisition unit 500 may also include a machine-learning algorithm that may be trained to analyze the camera 120, 122 images to detect the presence and location of the anomaly 109. Further discussions of training a machine learning model 506 are presented in reference to FIG. 6.

Figure 3:
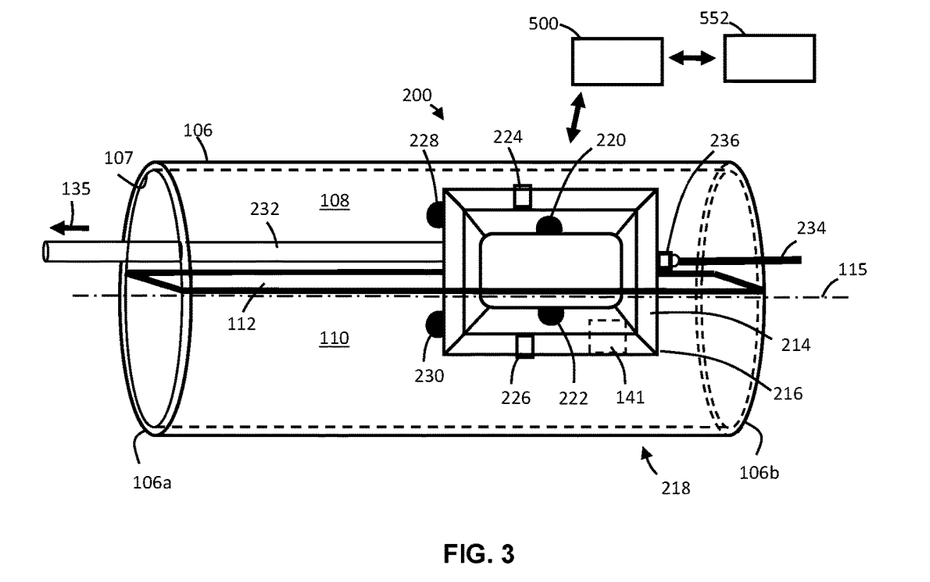
FIG. 3 is schematic diagram of another embodiment of a system for locating and determining anomalies in the conveyance pipe, where the system is transportable with an inner conveyance pipe.

Referring now to FIG. 3, FIG. 3 is a schematic view of an alternative embodiment of a system 200 for locating anomalies 109 in the conveyance pipe 106. The conveyance pipe 106 contains two-mediums (e.g., the gas medium 108 and the liquid medium 110) and thus includes the two-medium interface 112. The system 200 includes many components and features that are similar to the components and features described above with reference to the system 100. Accordingly, such features will not be described again in detail, except as necessary for the understanding of the system 200.

Similar to the system 100 described above, the system 200 includes an assembly 218 that includes an at least partially transparent enclosure 214 coupled to a frame 216. Instead of a front swivel 136 and a front tow cable 132 the system 200 includes an inner conveyance pipe 232 that is used to transport the assembly 218 within the conveyance pipe 106. The inner conveyance pipe 232 may be a hollow tubular member or a solid member and may be formed as a continuous length or may be formed by a plurality of segments jointed end-to-end. The inner conveyance pipe 232 is advanced along the direction 135 to transport the assembly 218 through the conveyance pipe 106. The assembly 218 rear swivel 236 and rear tow cable 234 continue to allow for stabilization to the assembly 218 as the inner conveyance pipe 232 transports the assembly 218. Alternatively, the rear tow cable 234 may provide substantially no tension to the swivel 236 and may simply be used to retrieve the assembly 218 in the event of the assembly 218 becoming stuck within the conveyance pipe 106. The assembly 218 also comprises an upper camera 220, a lower camera 222, an upper light 224, a lower light 226, an upper LiDAR device 228, and a lower LiDAR device 230, each positioned and operated in the manner previously described for the system 100.

Figure 4:
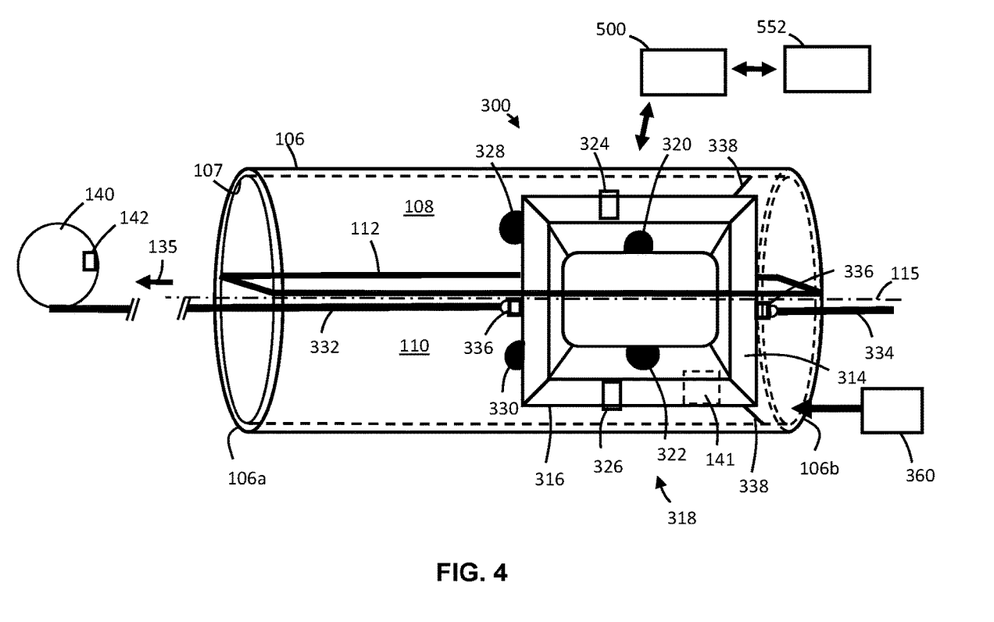
FIG. 4 is schematic diagram of a third embodiment of a system for locating and determining anomalies in the conveyance pipe, where the system is transportable with pressure.

Referring now to FIG. 4, FIG. 4 is a schematic view of an alternative embodiment of a system 300 for locating anomalies 109 in the conveyance pipe 106. The conveyance pipe 106 contains two-mediums (e.g., the gas medium 108 and the liquid medium 110) and thus includes the two-medium interface 112. The system 300 includes many components and features that are similar to the components and features described above with reference to the system 100. Accordingly, such features will not be described again in detail, except as necessary for the understanding of the system 300.

Similar to the system 100 described above, the system 300 includes an assembly 318 that includes an at least partially transparent enclosure 314 coupled to a frame 316. The assembly 318 comprises front and rear swivels 336 coupled to a front tow cable 332 and a rear tow cable 334, respectively. The front tow cable 332 and the rear tow cable 334 may be used to provide stabilization as the assembly 318 is hydraulically transported through the conveyance pipe 106 by a pump 360 providing pressure within the conveyance pipe 106. A skirt 338 coupled to the assembly 318 seals between the assembly 318 and the inside surface 107 of the conveyance pipe 106. The second end 106b is sealed (not shown) for pressurization by the pump 360 and the pressure captured between second end 106b and the skirt 338 transports the assembly 318 along the direction 135 through the conveyance pipe 106. The front tow cable 332 and a rear tow cable 334 may also be used if the assembly 318 becomes lodged within the conveyance pipe 106 or to aid in the transfer of the assembly 318 via the pump 360. For example, it is anticipated that anomalies 109 along the inside surface 107 will prevent pressure sealing by the skirt 338 and the front tow cable 332 and/or rear tow cable 334 will be used to advance the assembly 318 past the anomaly 109 for further transport of the assembly 318.

The assembly 318 also comprises an upper camera 320, a lower camera 322, an upper light 324, a lower light 326, an upper LiDAR device 328, and a lower LiDAR device 330, each positioned and operated in the manner previously described for the system 100.

Figure 5:
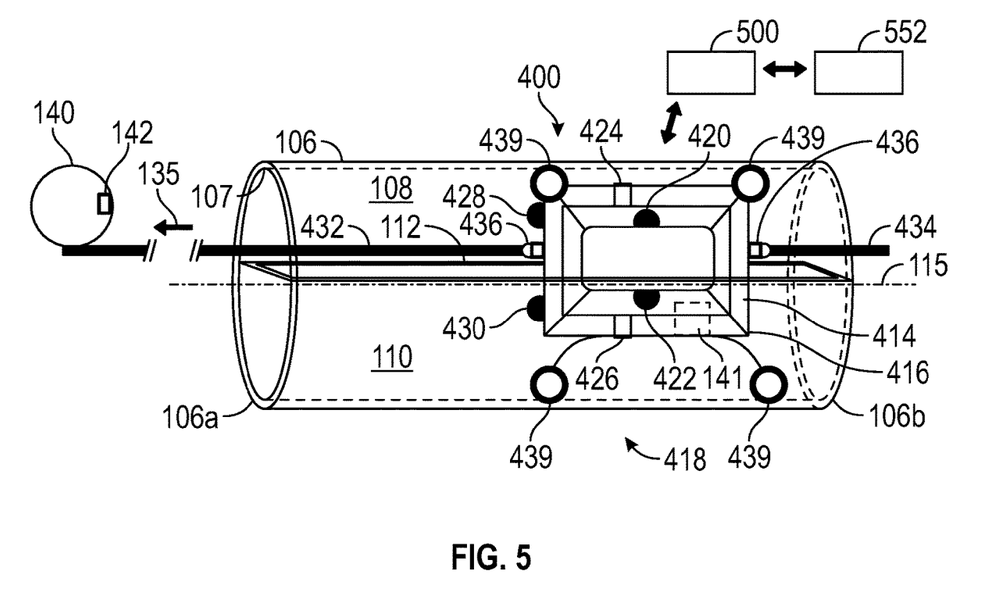
FIG. 5 is schematic diagram of a fourth embodiment of a system for locating and determining anomalies in the conveyance pipe, where the system is transportable with wheels.

Referring now to FIG. 5, FIG. 5 is a schematic view of an alternative embodiment of a system 400 for locating anomalies 109 in the conveyance pipe 106. The conveyance pipe 106 contains two-mediums (e.g., the gas medium 108 and the liquid medium 110) and thus includes the two-medium interface 112. The system 400 includes many components and features that are similar to the components and features described above with reference to the system 100. Accordingly, such features will not be described again in detail, except as necessary for the understanding of the system 400.

Similar to the system 100 described above, the system 400 includes an assembly 418 that includes an at least partially transparent enclosure 414 coupled to a frame 416. The assembly 418 comprises front and rear swivels 436 coupled to a front tow cable 432 and a rear tow cable 434, respectively. The front tow cable 432 and the rear tow cable 434 may be used to provide stabilization as the assembly 418 is transported through the conveyance pipe 106 by one or more wheels 439 interfacing with the inside surface 107. One or more of the wheels 439 may be motorized to provide driving forces to advance the assembly 418 in the direction 135 and opposite from the direction 135 as needed. The example of FIG. 5 depicts four wheels 439 coupled to the assembly 418, however any number of wheels 439 may be used. The lower two wheels 439 in the example of FIG. 5 are coupled to the frame 416 via flexible members to maintain contact between at least the lower wheels 439 and the inside surface 107. However, rigid mounting for the wheels 439 is also contemplated for assemblies 418 with negative buoyancy. Still further, the wheels 439 may also be coupled to the frame 416 with other adjustable height suspension mountings including for example multi-bar linkages with compression springs and/or pneumatically or hydraulically extendable cylinders. Power to operate the motorized wheels 439 may be provided from conductive elements within the front tow cable 432, the rear tow cable 434, or via batteries stored within the enclosure 414.

The assembly 418 may also be configured to float within the liquid medium 110 as previously discussed for the system 100 and the front tow cable 432 may be used together with driving forces from the wheels 439. Optionally, the wheels 439 may not be motorized and the front tow cable 432 may be used to transport the assembly 418 through the conveyance pipe 106.

The assembly 418 also comprises an upper camera 420, a lower camera 422, an upper light 424, a lower light 426, an upper LiDAR device 428, and a lower LiDAR device 430, each positioned and operated in the manner previously described for the system 100.

Figure 6:
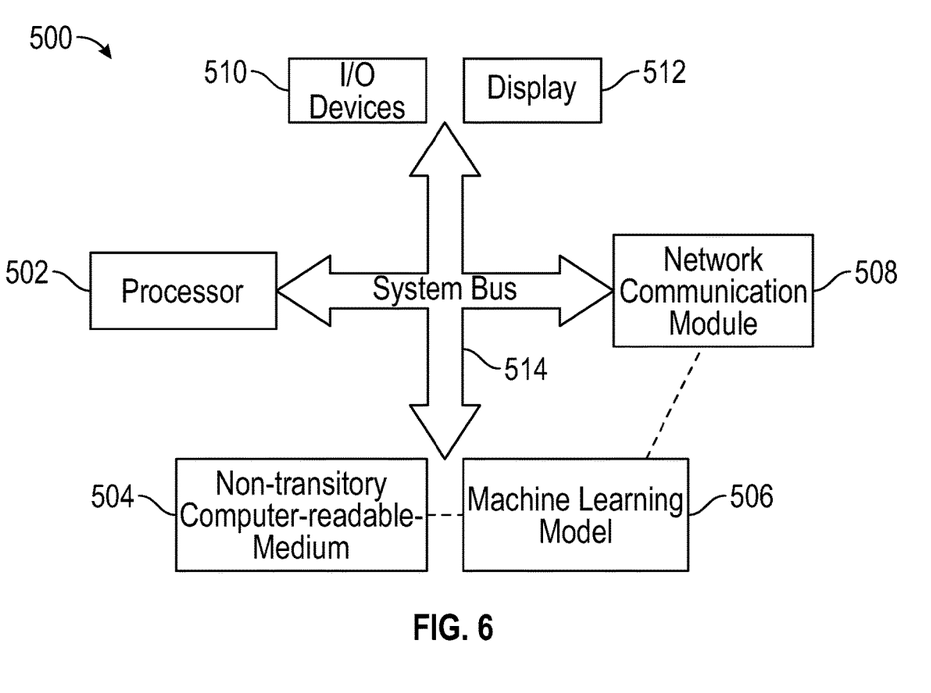
FIG. 6 is a block diagram of a data acquisition unit, according to one or more embodiments.

Referring to FIG. 6, a block diagram of a data acquisition unit 500 that can be used to electrically (e.g., wired or wirelessly) communicate with the assemblies 118, 218, 318, 418 of systems 100, 200, 300, 400, respectively. The data acquisition unit 500 includes at least one processor 502, a non-transitory computer readable medium 504, an optional machine learning model 506, an optional network communication module 508, an optional input/output devices 510, a data storage drive or device, and an optional display 512 all interconnected via a system bus 514. In at least one embodiment, the input/output device 510 and the display 512 may be combined into a single device, such as a touch-screen display. Software instructions executable by the processor 502 for implementing software instructions stored within the data acquisition unit 500 in accordance with the illustrative embodiments described herein, may be stored in the non-transitory computer readable medium 504 or some other non-transitory computer-readable medium.

As best shown in FIGS. 2-5, the data acquisition unit 500 may be connected to the remote terminal 552 via one or more public and/or private networks via appropriate network connections. It will also be recognized that software instructions may also be loaded into the non-transitory computer readable medium 504 from an appropriate storage media or via wired or wireless means.

In various examples the machine learning model 506 may include various algorithms used to provide "artificial intelligence" to the data acquisition unit 500. These machine learning models 506 may include reinforcement learning algorithms, Artificial Neural Networks, decision trees, support vector machines, genetic algorithms, Bayesian networks, or the like. The models may include publicly available services (e.g., via an Application Program Interface with the provider) as well as purpose-trained or proprietary services, which may be deployed locally or accessed via a networked service. One of ordinary skill in the relevant art will recognize that different domains may benefit from the use of different machine learning models 506, which may be continuously or periodically trained based on received feedback. Accordingly, the person of ordinary skill in the relevant art will be able to select or design an appropriate machine learning model 506 based on the details provided in the present disclosure to identify the presence and location of anomalies 109 within the conveyance pipe 106.

For example, referring to the system 100 of FIG. 2 and FIG. 6, a plurality of captured images from the cameras 120, 122 may be collected by the data acquisition unit 500 and stored within the non-transitory computer-readable medium 504. Some of the plurality of images will contain no anomalies 109 while other images of the plurality will contain anomalies 109 as determined by the methods described herein or by conventional methods. The captured images with and without anomalies 109 are then provided to the machine learning model 506 and the processor 502 is used to analyze the captured images. The analysis of the captured images together with the pre-determined presence or non-presence of the anomalies 109 allows the processor 502 and the machine learning model 506 to correlate particular image features with the identified anomaly 109 characteristic (e.g., size, shape, color, etc.).

Alternatively, sets of before and after images of the same portion of the conveyance pipe 106 may be used to train the machine learning model 506. Initial images from the cameras 120, 122 may be collected by the data acquisition unit 500 during a first transport of the assembly 118 within the conveyance pipe 106. The longitudinal position of each image is also collected by the data acquisition unit 500 via the signal from the transducer 142. The captured images from the cameras 120, 122 and the corresponding positions from the transducer 142 are stored within the non-transitory computer-readable medium 504. The conveyance pipe 106 is then returned to operational service in conveying materials (e.g., such as in dredging operations) and accumulates wear-and-tear that changes the condition and appearance of the inside surface 107. The assembly 118 is again transported within the conveyance pipe 106 and a plurality of secondary images from the cameras 120, 122 are collected along with the corresponding positions from the transducer 142. The plurality of secondary images are also stored within the non-transitory computer-readable medium 504 along with the corresponding positions from the transducer 142. The plurality of initial images are related to the plurality of secondary images based on the position within the conveyance pipe 106 as measured by the signal of the transducer 142. Any anomalies 109 present in the secondary images are identified by the methods previously described herein and images of the confirmed anomalies 109 along with the initial image of that same location are provided to train the machine learning model 506. By comparing the plurality of initial images and the plurality of secondary images in this manner, the machine learning model 506 is trained to ignore features and similarities between the initial and secondary images that are not related to the anomalies 109.

While compositions and methods are described herein in terms of "comprising" various components or steps, the compositions and methods can also "consist essentially of" or "consist of" the various components and steps. Certain terms are used throughout the description and claims to refer to particular features or components. As one skilled in the art will appreciate, different persons may refer to the same feature or component by different names. This document does not intend to distinguish between components or features that differ in name but not function.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A system for locating an anomaly along an inside surface of a conveyance pipe containing two mediums separated by a two medium interface, the system comprising:

an assembly transportable within the conveyance pipe, the assembly comprising:
an enclosure that is at least partially transparent and is positionable to be located both above and below the two medium interface; and an upper camera and a lower camera enclosed within the enclosure and operable to capture images of the inside surface of the conveyance pipe above and below the two medium interface; and a data acquisition unit in electronic communication with the upper camera and the lower camera, the data acquisition unit comprising a processor programmed to determine a presence and a location of the anomaly by analyzing the captured images.

2. The system of claim 1, wherein the conveyance pipe comprises a plurality of sections coupled by joints, and wherein the processor is further programmed to determine the location of the anomaly by counting a quantity of joints the assembly moves past as the assembly is transported within the conveyance pipe.

3. The system of claim 1, wherein the assembly further comprises an upper light and a lower light at least partially outside of the enclosure and operable to illuminate the inside surface of the conveyance pipe.

4. The system of claim 1, wherein the assembly is buoyant and is configured to float within one of the two mediums such that the upper camera is positionable above the two medium interface while the lower camera is below the two medium interface.

5. The system of claim 1, further comprising a remote terminal in electrical communication with the data acquisition unit and operable to display at least one of the captured images, video of the inside surface, the presence of the anomaly, or the location of the anomaly.

6. The system of claim 1 further comprising:
a front tow cable couplable between the assembly and a reel which is positionable outside the conveyance pipe, wherein rotation of the reel advances the assembly within the conveyance pipe; and
a transducer in electrical communication with the data acquisition unit, wherein a signal from the transducer is relatable to a length of the front tow cable within the conveyance pipe and the location of the anomaly.

7. The system of claim 1, wherein the assembly further comprises a frame and a plurality of wheels coupled to the enclosure.

8. The system of claim 1, wherein the processor is further programmed to determine the presence and the location of or predict a formation of the anomaly using a machine learning model.

9. The system of claim 1, wherein the assembly further comprises:
an upper light detection and ranging ("LiDAR") device and a lower LiDAR device operable to capture dimensional measurements of the conveyance pipe above and below the two medium interface; and
wherein the upper LiDAR and the lower LiDAR are in electrical communication with the data acquisition unit and the processor is further programmed to analyze the dimensional measurements of the conveyance pipe to determine the presence and the location of the anomaly.

10. The system of claim 9, wherein the upper LiDAR device and the lower LiDAR device are located outside of the enclosure.

11. A method for locating an anomaly along an inside surface of a conveyance pipe containing two mediums separated by a two medium interface, the method comprising:

transporting an assembly within the conveyance pipe, the assembly comprising an enclosure that is at least partially transparent, wherein the enclosure is positioned both above and below the two medium interface;
capturing images of the inside surface of the conveyance pipe above and below the two medium interface using an upper camera and a lower camera enclosed within the enclosure; and
determining a presence and a location of the anomaly by analyzing the captured images using a processor of a data acquisition unit.

12. The method of claim 11, wherein the conveyance pipe comprises a plurality of sections coupled by joints and determining the presence and the location of the anomaly by analyzing the captured images further comprises using the processor to count a quantity of joints the assembly moves past as the assembly is transported within the conveyance pipe.

13. The method of claim 11, further comprising illuminating an inside surface of the conveyance pipe above and below the two medium interface using an upper light and a lower light that are located at least partially outside of the enclosure.

14. The method of claim 11, wherein the transporting of the assembly further comprises floating the assembly within one of the two mediums such that the upper camera is positioned above the two medium interface while the lower camera is below the two medium interface.

15. The method of claim 11, further comprising communicating at least one of the captured images, video of the inside surface, the presence of the anomaly, or the location of the anomaly to a remote terminal in electrical communication with the data acquisition unit.

16. The method of claim 11, further comprising:
wherein transporting an assembly within the conveyance pipe further comprises rotating a reel to retract a front tow cable coupled to the assembly; and
monitoring a signal from a transducer with the data acquisition unit, wherein the signal is relatable to a length of the front tow cable within the conveyance pipe and the location of the anomaly.

17. The method of claim 11, further comprising transporting the assembly on a plurality of wheels coupled to a frame and the enclosure.

18. The method of claim 11, further comprising determining the presence of the anomaly or predict formation of the anomaly by using a machine learning model.

19. The method of claim 11, further comprising:
capturing dimensional measurements of the conveyance pipe from above and below the two medium interface using an upper light detection and ranging ("LiDAR") device and a lower light detection and ranging ("LiDAR") device, each coupled to the assembly;
communicating the dimensional measurements to the data acquisition unit; and
determining the presence and location of the anomaly by analyzing the dimensional measurements with the processor.

20. The method of claim 19, wherein the upper LiDAR device and the lower LiDAR device are located outside of the enclosure.

* * * * *